March 14, 1950 R. SCHÜPBACH 2,500,875

TUNABLE HIGH FREQUENCY TANK CIRCUIT

Filed Feb. 28, 1944

Inventor:

Rudolf Schüpbach,

By

Pierce & Scheffler,

Attorneys.

Patented Mar. 14, 1950 2,500,875

UNITED STATES PATENT OFFICE 2,500,875

TUNABLE HIGH-FREQUENCY TANK CIRCUIT

Rudolf Schüpbach, Baden, Switzerland, assignor to "Patelhold" Patentverwertungs- & Elektro-Holding A.-G., Glarus, Switzerland Application February 28, 1944, Serial No. 524,341
In Switzerland February 18, 1943

Section 1, Public Law 690, August 8, 1946
Patent expires February 18, 1963

2 Claims. (Cl. 178—44)

For transmitting and receiving very short electromagnetic waves it is preferable to employ resonators for the tank circuits. Such tank circuits can for instance be tuned by altering the volume of the resonator which determines its frequency. For this purpose one of the walls can be made flexible or by means of an element which projects into the inside of the resonator to a variable extent it is possible to vary the course of the lines of force. Other constructions are also known which have a partially concentrated capacitance which can be adjusted so as to produce a variation in the frequency. With these known arrangements the hyperbolic course of the frequency as a function of the movement of the tuning element often has a disturbing effect.

Instead of the aforementioned arrangements it is now proposed to employ a resonator with variable natural frequency in which a variable condenser is used to alter the frequency, this condenser forming at least part of the capacitance of the resonator, there being a prescribed particularly linear connection between the natural frequency of the resonator and the mechanical adjustment of the condenser as a result of the shape which the latter is given.

According to the invention this variable condenser consists of a plate condenser formed by two parallel plates of which one supports at least one metallic cylinder, whereby firstly, the metallic cylinder forms one electrode of a cylindrical condenser; secondly, the axis of the cylinder coincides with the central perpendicular of the plate; thirdly, the length of the peripheral surface of the cylinder can be varied along the periphery of the cylinder; fourthly, the cylinder projects to a variable extent into a recess forming the other electrode of the cylindrical condenser in the other plate of the plate condenser, at least one of the condenser electrodes being displaceable in the direction of the axis of the cylindrical condenser.

Figure 1:
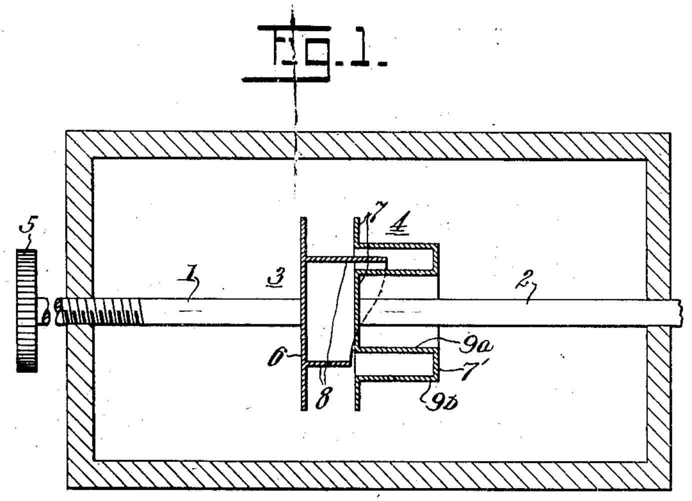
Figure 2:
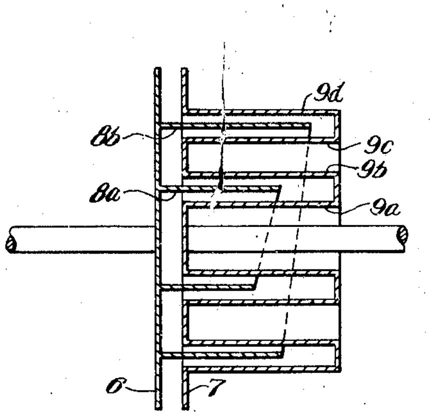

The invention and the advantages achieved thereby are explained by means of constructional examples illustrated in the accompanying drawing in which:

Fig. 1 is a longitudinal central section through a tunable high frequency tank circuit embodying the invention; and Fig. 2 is a fragmentary central section through another form of condenser according to the invention. A resonator as illustrated in Fig. 1 has distributed inductance and capacitance. The inductance is, however, represented by the conductors 1, 2 and the capacitance by the variable condenser with the electrodes 3, 4. By means of the tuning knob 5 it is possible to displace condenser electrode 3 in a horizontal direction with the aid of appropriate means, such as the threaded mounting of the conductor 1 in the resonator end wall as shown in the drawing, so that the capacitance is altered. The condenser consists of a plate condenser with plates 6 and 7 and a cylindrical condenser with cylinders 8 and 9a, 9b. The cylinders 8, 9a and 9b are coaxial and project in the same direction from their respective supporting plates; the plate 7 comprising a central circular portion and an outer annular portion, and the ends of the cylinders 9a, 9b remote from plate 7 being connected by a metal annulus 7' integral with cylinders 9a, 9b. The length of the peripheral surface of cylinder 8 can be varied along its circumference and follows an exactly prescribed course. For this reason the cylinder does not simultaneously project along its whole circumference into the annular recess 9 between cylinders 9a, 9b and therefore the surface of the metallic cylinder 8 within the recess 9 is not proportional to the horizontal translatory movement produced by rotating the knob 5. By this means it is possible to obtain within wide limits an adjustable variation of the capacitance of the cylindrical condenser as a function of the rotational movement of tuning knob 5.

If it is particularly desired that the frequency of the resonator should be a linear function of the translatory movement of the condenser electrode, then the combination of the cylindrical condenser 8, 9a, 9b with a plate condenser 6, 7 is especially favourable. From the relationship $$2\pi f = \frac{1}{\sqrt{LC}}$$

it is obvious that in the region of the smaller frequencies the alterations in capacitance must be greater than in the range of the higher frequencies, in order to produce the same change in frequency. Therefore in order to obtain such a linear curve when plate condenser 6, 7 does not exist, the surface of cylinder 8 projecting into recess 9 would have to increase very greatly when the frequencies become smaller, that is when cylinder 8 projects into the recess to an increasing extent. Since below a certain frequency this would, however, necessitate an impracticable construction which would become too large, it is much more advantageous to provide also a plate condenser with plates 6, 7. The curve which represents the capacitance of such a condenser as a function of the distance between the plates shows that there is a big variation when the plate gap is small. The two condensers thus augment each other in a very suitable manner so that the desired linear relationship between the frequency and the translatory movement can be obtained. The size and shape of the plates and the cylindrical condenser required to produce the desired frequency curve can easily be determined either graphically or by calculation, so that the practical design of the condenser is a simple matter.

Although the condenser according to the invention is particularly suitable for linearisation, by giving the plate and cylindrical condenser a suitable shape it is also possible to obtain a different kind of frequency curve for the resonator within the tuning range, such curve being adjustable within wide limits. This is desirable for instance when synchronism is to be achieved with another oscillation circuit, whose frequency response curve cannot be adjusted. Such a resonator can also be employed to advantage in superheterodyne receivers with a constant difference between the message and carrier frequency. Furthermore due to the small distance between the plates in the cylindrical condenser a concentration of the capacitance is obtained which is a great advantage.

As shown in Fig. 2, the movable electrode may be composed of several coaxial cylinders 8*a*, 8*b* carried by the circular plate 6, each cylinder being associated with a corresponding recess formed between pairs of coaxial cylinders 9*a*, 9*b* and 9*c*, 9*d* respectively carried by the plate section 7. It is expedient to construct the cylinders in such a manner that one cylinder 8*a* commences to dip into the recess as soon as the adjacent longer cylinder 8*b* projects into its recess along its entire periphery. For this reason generally with two cylinders which project into recesses one after the other, the smallest length of the cylinder 8*b* which first projects into its recess is equal to the greatest length of the cylinder 8*a* which is next moved into its recess. Furthermore usually the axial length of the peripheral surface of the cylinder decreases continuously along the circumference from the point where it is a maximum, so that the points of maximum and minimum cylinder length lie in the same diametrical plane.

It is an advantage to provide an adjustable frequency-determining device for the purpose of obtaining any desirable initial and final values of the variable frequency response curve, this device remaining fixed during operation. This device is so constructed that it causes the capacitance and/or the inductance of the resonator to be altered.

I claim:

1. A variable condenser for altering the natural frequency of a tank circuit resonator and forming a part thereof comprising, in combination, a pair of parallel metallic plates, means for moving said plates toward and away from each other along an axis perpendicular thereto, a pair of spaced metallic cylinders extending from one of said plates and forming a continuation thereof, means electrically and mechanically connecting the ends of said cylinders remote from said one plate and a single metallic cylinder extending from the other of said plates in the same direction that said pair of cylinders extends from said one plate and forming a continuation of said other plate and movable therewith relative to said one plate into and out of the annular space between said pair of cylinders, the peripheral surface of said single cylinder being non-uniform to the extent that a substantially linear relation is provided between the natural frequency of the resonator and the spacing between said plates.

2. A variable condenser for altering the natural frequency of a tank circuit resonator and forming a part thereof comprising, in combination, a pair of parallel metallic plates, means for moving said plates toward and away from each other along an axis perpendicular thereto, and a pair of concentric metallic cylinders extending from one of said plates and forming continuations thereof, each of said cylinders having a peripheral surface of non-uniform axial length and the maximum length of one being equal to the minimum length of the other, there being a corresponding annular recess for each of said cylinders in the other of said plates formed by cylindrical extensions thereof in the same direction that said cylinders extend from said one plate.

RUDOLF SCHÜPBACH.

REFERENCES CITED

The following references are of record in the file of this patent:

UNITED STATES PATENTS

| Number | Name | Date |
|---|---|---|
| 1,592,834 | Lilienthal | July 20, 1926 |
| 1,625,330 | Pinkus | Apr. 19, 1927 |
| 1,718,783 | Herman | June 25, 1929 |
| 2,251,085 | Unk | July 29, 1941 |
| 2,328,561 | Lavoie | Sept. 7, 1943 |

FOREIGN PATENTS

| Number | Country | Date |
|---|---|---|
| 511,795 | Great Britain | Aug. 24, 1939 |
| 622,515 | Germany | Nov. 29, 1935 |
| 716,714 | France | Dec. 26, 1931 |